US010588259B2

(12) United States Patent
Isaac et al.

(10) Patent No.: US 10,588,259 B2
(45) Date of Patent: Mar. 17, 2020

(54) LOCATION BASED CHOP TO SWATH CONVERSION FOR RIPARIAN BUFFER ZONE MANAGEMENT

(71) Applicant: CNH Industrial America LLC, New Holland, PA (US)

(72) Inventors: Nathan E. Isaac, Lancaster, PA (US); Mark David Dilts, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 34 days.

(21) Appl. No.: 15/645,212

(22) Filed: Jul. 10, 2017

(65) Prior Publication Data

US 2019/0008091 A1 Jan. 10, 2019

(51) Int. Cl.
  *A01D 41/127* (2006.01)
  *A01D 41/12* (2006.01)
  *A01F 29/06* (2006.01)
  *A01D 91/04* (2006.01)
  *B60K 35/00* (2006.01)
  (Continued)

(52) U.S. Cl.
  CPC ....... *A01D 41/127* (2013.01); *A01D 41/1243* (2013.01); *A01D 91/04* (2013.01); *A01F 12/40* (2013.01); *A01F 29/06* (2013.01); *B60K 35/00* (2013.01); *A01D 57/12* (2013.01); *A01F 7/06* (2013.01); *A01F 12/446* (2013.01); *B60K 2370/11* (2019.05); *B60K 2370/1438* (2019.05); *B60K 2370/152* (2019.05); *B60K 2370/186* (2019.05)

(58) Field of Classification Search
  CPC .. A01D 41/127; A01D 41/1243; A01D 91/04; A01F 29/06; A01F 12/40; A01F 12/446; A01F 7/06; B60K 35/00; B60K 2350/1028; B60K 2350/1096; B60K 2350/1004
  See application file for complete search history.

(56) References Cited

U.S. PATENT DOCUMENTS 5,666,793 A * 9/1997 Bottinger ............. A01B 79/005
  460/1
7,066,810 B2 * 6/2006 Farley ................ A01D 41/1243
  460/112

(Continued)

OTHER PUBLICATIONS

Extended European Search Report for EP Application 18181264.5 dated Oct. 29, 2018 (6 pages).

*Primary Examiner* — Michael J Zanelli
(74) *Attorney, Agent, or Firm* — Patrick M. Sheldrake; Peter K. Zacharias

(57) ABSTRACT

A combine comprising a chassis, a crop residue handling system including a residue chopper, residue spreader, a spreader chute and a swath selection door, a receiver configured to determine a location of the combine, and a controller that controls the residue handling system. The controller configured to determine the location of the combine on a map, execute a crop residue spreading mode in response to the controller determining that the location of the combine is located in a designated crop residue spreading zone indicated on the map, and execute a crop residue windrow mode in response to the controller determining that the location of the combine is located in a designated crop residue windrow zone indicated on the map.

18 Claims, 15 Drawing Sheets

(51) Int. Cl.
*A01F 12/40* (2006.01)
*A01F 7/06* (2006.01)
*A01D 57/12* (2006.01)
*A01F 12/44* (2006.01)

(56) References Cited

U.S. PATENT DOCUMENTS

| | | | |
|---|---|---|---|
| 8,463,510 B2 | 6/2013 | Knapp | |
| 8,738,244 B2 * | 5/2014 | Lenz | A01B 63/00 |
| | | | 701/50 |
| 8,777,707 B2 | 7/2014 | Hoyle | |
| 2008/0248843 A1 | 10/2008 | Birrell et al. | |
| 2009/0287380 A1 | 11/2009 | Chervenka et al. | |
| 2012/0245802 A1 | 9/2012 | Schlesser et al. | |
| 2012/0270613 A1 * | 10/2012 | Isaac | A01F 12/40 |
| | | | 460/111 |
| 2015/0011275 A1 * | 1/2015 | Murray | A01F 12/00 |
| | | | 460/111 |
| 2015/0208579 A1 * | 7/2015 | Patterson | A01F 12/58 |
| | | | 460/112 |
| 2016/0135377 A1 | 5/2016 | Ballegeer et al. | |
| 2016/0183458 A1 | 6/2016 | Buhler et al. | |

\* cited by examiner

| Modes | Chopper Speed | Counter Knives | Chop/Swath Door | Chaff Chute |
|---|---|---|---|---|
| Straw Windrow and Chaff Windrow | Low Speed | Disenganged | Open | Vertical Position |
| Straw Windrow and Chaff Spread | Low Speed | Disenganged | Open | Horizontal Position |
| Straw Spread and Chaff Windrow | High Speed | Engaged or Disenganged | Closed | Vertical Position |
| Straw Spread and Chaff Spread | High Speed | Engaged or Disenganged | Closed | Horizontal Position |

LOCATION BASED CHOP TO SWATH CONVERSION FOR RIPARIAN BUFFER ZONE MANAGEMENT

FIELD

The present invention relates a combine that automatically switches between chopping and spreading modes based on its determined location on a geographic information system map.

BACKGROUND

State of the art harvesters (e.g. combines) are used to harvest crops. Operations performed by these combines include chopping the crop and producing residue. The residue is either spread over the harvested land to reduce erosion, or piled into rows during a process called windrowing for later collection in a baling process. These state of the art combines, however, depend on the operator to decide when to switch between spreading and windrowing. This may require the operator to stop the combine and manually press a button on the combine controller. Relying on the operator to perform this process during the harvesting process leads to an increase in harvesting time, and potentially choosing an incorrect mode for a given region due to human error, or inconsistent variability in the change-over area that does not maximize the intended residue function.

SUMMARY

An embodiment includes a combine comprising a chassis, a crop residue handling system including a residue chopper, residue spreader, a spreader chute and a swath selection door, a receiver configured to determine a location of the combine, and a controller that controls the residue handling system. The controller is configured to determine the location of the combine on a map, execute a crop residue spreading mode by closing said swath selection door to spread the crop residue or by positioning the spreader chute to spread the crop reside, in response to the controller determining that the location of the combine is located in a designated crop residue spreading zone indicated on the map, and execute a crop residue windrow mode opening said swath selection door to pile the crop residue in windrows or by positioning the spreader chute to pile the crop residue in windrows, in response to the controller determining that the location of the combine is located in a designated crop residue windrow zone indicated on the map.

An embodiment includes a method for controlling a combine including a chassis, a crop residue handling system including a residue spreader, a spreader chute, and a swath selection door, a receiver configured to determine a location of the combine, and a controller configured to control the residue handling system. The method comprising determining, by the controller, the location of the combine on a map, executing, by the controller, a crop residue spreading mode by closing said swath selection door to spread the crop residue or by positioning the spreader chute to spread the crop reside, in response to the controller determining that the location of the combine is located in a designated crop residue spreading zone indicated on the map, and executing, by the controller, a crop residue windrow mode by opening said swath selection door to pile the crop residue in windrows or by positioning the spreader chute to pile the crop residue in windrows, in response to the controller determining that the location of the combine is located in a designated crop residue windrow zone indicated on the map.

BRIEF DESCRIPTION OF THE FIGURES

FIG. 1F is a table of example modes of operation.

DETAILED DESCRIPTION

Aspects of the present invention provide methods and systems for operating a combine to automatically perform crop spreading and windrowing. Generally, the system determines the location of the combine on a map and automatically switches between crop spreading and windrowing based on designated chopping and spreading zones identified in the map.

The terms "grain," "straw," and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, material other than grapes (MOG) or straw. Incompletely threshed crop material is referred to as "tailings." Also the terms "forward," "rearward," "left," and "right", when used in connection with the agricultural harvester (e.g.

combine) and/or components thereof are usually determined with reference to the direction of forward operative travel of the combine, but again, they should not be construed as limiting. The terms "longitudinal" and "transverse" are determined with reference to the fore-and-aft direction of the agricultural combine and are equally not to be construed as limiting.

Figure 1A:
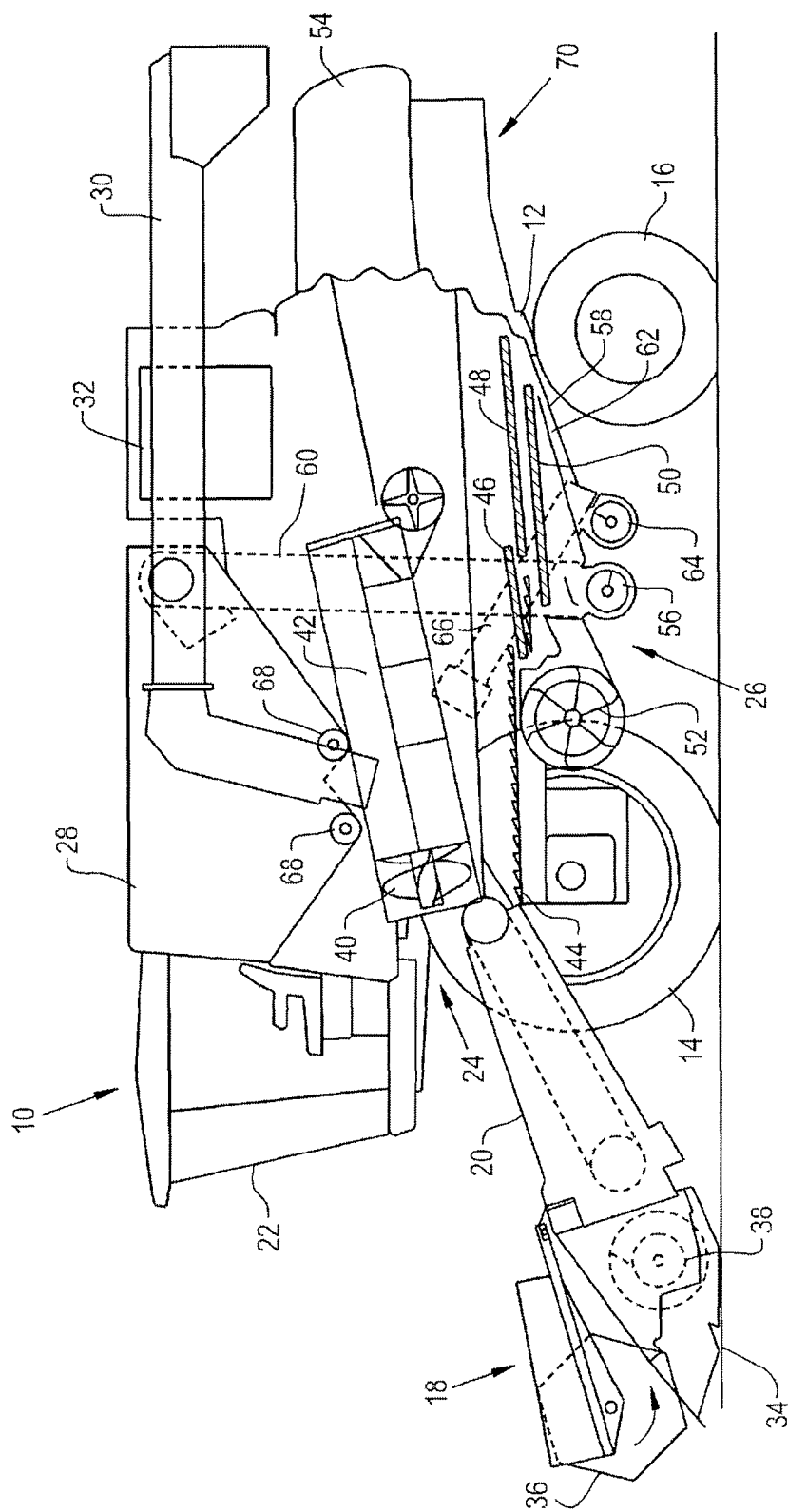
FIG. 1A is a side view of a combine, according to an embodiment of the present invention.

Referring now to the drawings, and more particularly to FIG. 1A, there is shown one embodiment of an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 includes a chopper, counter knives, a swath selection door and a residue spreader. When combine 10 operating in the chopping and spreading mode, the chopper is set to a relatively high speed (e.g. 3,000 RPM), the counter knives may be engaged, the swath selection door is closed and the residue spreader is running (e.g. rotating). This causes the non-grain crop material to be chopped in to pieces of approximately 6 inches or less and spread on the ground in a fairly uniform manner. In contrast, when combine 10 is operating in the windrow mode, the chopper is at a relatively low speed (e.g. 800 RPM), the counter knives are disengaged and the swath selection door is open. The residue spreader may continue operation to spread only the chaff, with the crop material passing through the passageway created by the open swath selection door.

Figure 1B:
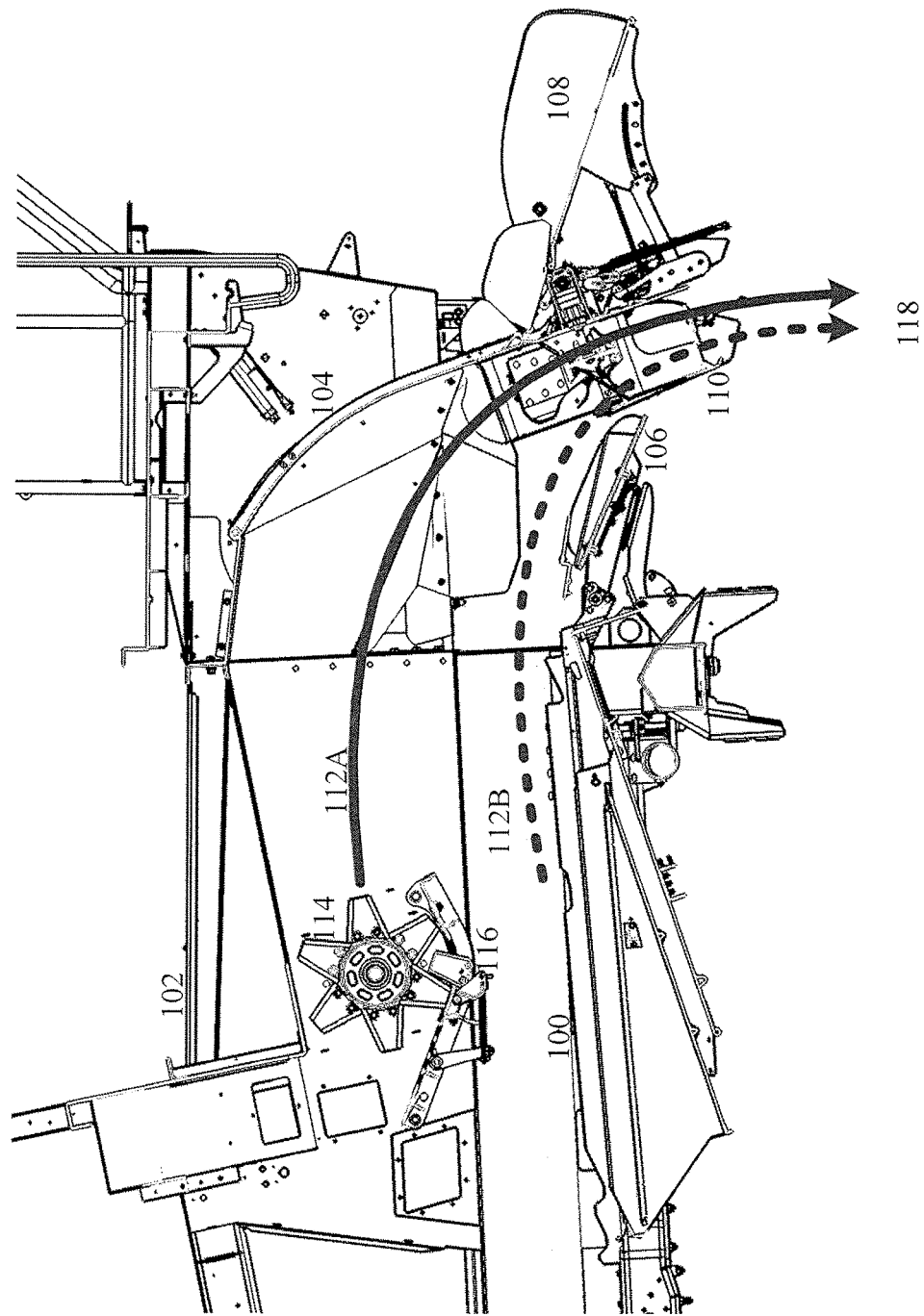
FIG. 1B is a section view of a combine residue system configured in a spreading mode, according to an embodiment of the present invention.

Details of residue system 70 and an explanation of their operation are shown in FIGS. 1B, 1C, 1D, 1F and 1E. For example, as shown in FIG. 1B, residue system 70 includes a bottom wall 100, a top wall 102, side walls (not shown for clarity), a swath selection door 104, a spreader chute 106, a windrow chute 108, spreader impellers 110, chopper 114 and counter knives 116.

Swath selection door 104 is an automated sliding or hinged door that opens and closes due to the force of an actuator (not shown) which may be implemented as an electromechanical actuator, hydraulic actuator, etc. Spreader chute 106 is a hinged chute that may be tilted in a substantial horizontal or a substantially vertical position due to the force of an actuator (not shown). In addition, spreader impellers 110 are automated impellers that spin due to the force of a motor (not shown), which may be implemented as an electric motor, hydraulic motor, combustion engine, etc.

Although not shown in FIG. 1B, 1C, 1D, or 1E, swath selection door 104, chopper 114, knives 116, spreader chute 106 and spreader impellers 110 are electrically connected to a controller (e.g. programmable logic controller, microcontroller, etc.) located in the combine. The controller is programmable by the operator of the combine through a user (e.g. operator) interface, or through a remote computer (see FIG. 3). The operator, for example, enters commands through the user interface. In response to these commands, the controller sends control signals to the various actuators (e.g. spreader motors, swath selection door actuator, etc.) of residue handling system 70.

As described above, the residue system may be configured in a spreading mode, a windrow mode, or a combined spreading/windrow mode. These operating modes are described with reference to FIGS. 1B, 1C, 1D, 1E and 1F.

In a first mode (spread both straw and chaff), FIG. 1B shows the residue system operating in the spreading mode. In this mode, the combine controller controls the swath selection door actuator to position swath selection door 104 (e.g. hinged door) in the closed position, controls the motors to rotate the spreader impellers and controls the motors to rotate chopper 114. This closed configuration generally prevents residue from exiting the residue system through windrow chute 108. In addition, spreader chute 106 is tilted in a substantially horizontal direction which directs the chaff to the spreader impellers. When swath selection door 104 is in this closed position, two types of residue (e.g. straw and chaff) passes together (along paths 112A and 112B respectively), and comes into contact with spreader impellers 110. Due to the rotation of spreader impellers 110, the residue is spread evenly along the ground in directions 118 as the combine is moving. This evenly spread residue is beneficial, because it prevents erosion of the land after the crop has been harvested and permits timely decomposition of the residue nutrient value.

It should be noted that the straw may or may not be chopped before being spread. In one example (as shown in FIG. 1B), chopped straw may be spread by engaging counter knives 116, such that when the straw is moved passed the knives by chopper 114, the straw is cut into pieces which are then thrown along path 112A. In another example (not shown), unchopped straw may be spread by disengaging the counter knives 116, such that the uncut straw is thrown by the chopper along path 112A. In either example, the chaff may still travel along path 112B towards the spreader impellers.

Figure 1C:
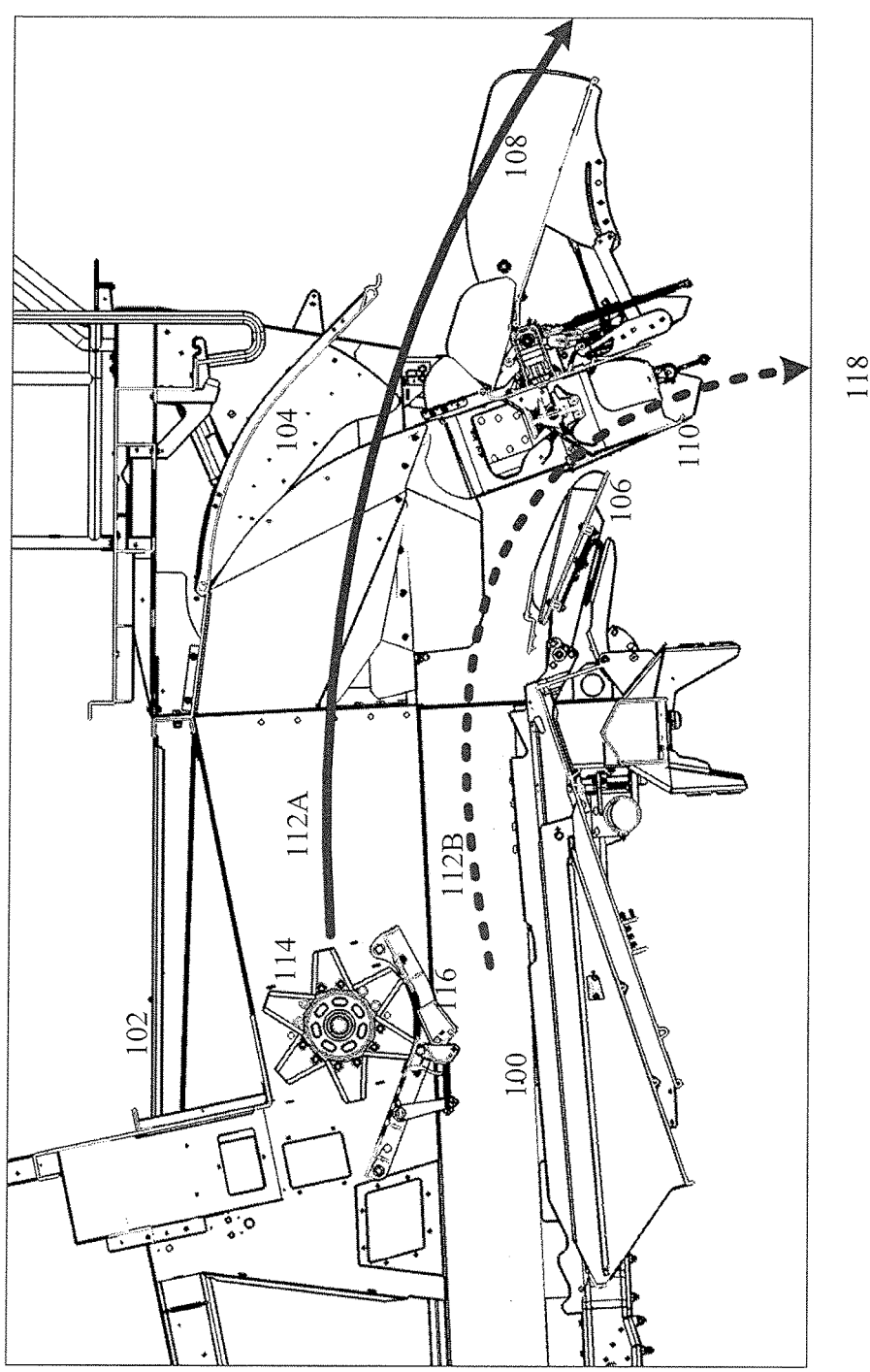
FIG. 1C is a section view of a combine residue system configured in a combined windrow and spreading mode, according to an embodiment of the present invention.

In a second mode (spread chaff and windrow straw), FIG. 1C shows the residue system operating in a combined windrow/spreading mode. In this mode, the combine controller positions spreader chute 106 such that it is tilted in a substantially horizontal direction. This directs the chaff towards the spreader impellers. The controller also controls the swath selection door actuator to position swath selection door 104 in the open position. When swath selection door 104 is in this open position, the residue that is previously processed by the chopper 114 and counter knives 116 travels along path 112A, passes through the opening provided by swath selection door 104, and exits the combine through windrow chute 108. Due to the directional configuration of windrow chute 108, the residue is piled in a row (not shown) on the ground as the combine moves through the field. These rows of residue are later bailed and collected for use (e.g. sale to consumers).

Figure 1D:
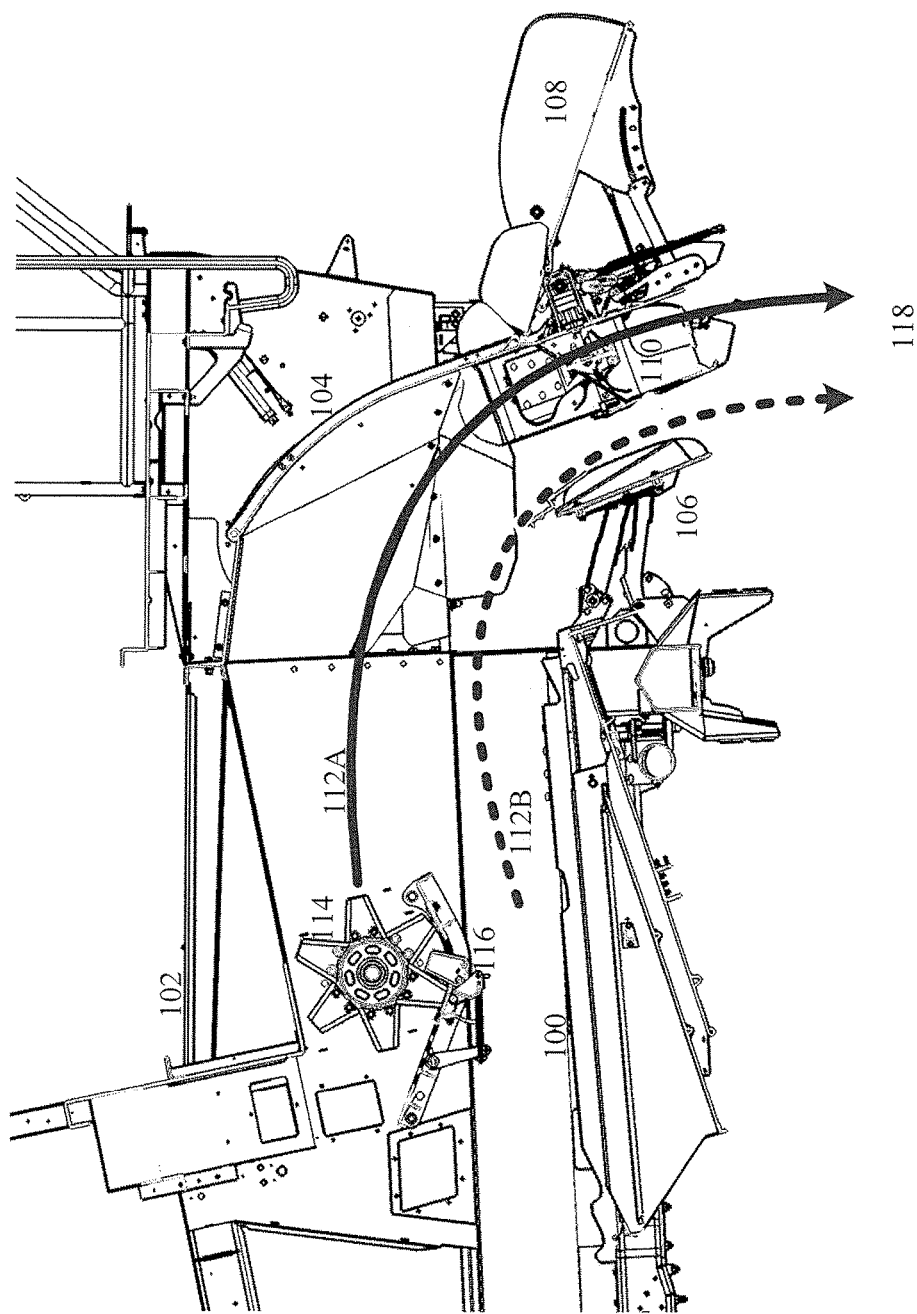
FIG. 1D is another section view of a combine residue system configured in a combined windrow and spreading mode, according to an embodiment of the present invention.

In a third mode (spread straw and windrow chaff), FIG. 1D shows the residue system operating in a combined windrow/spreading mode. In this mode, the combine controller positions spreader chute 106 such that it is tilted in a substantially vertical direction. This directs the chaff towards away from the spreader impellers allowing the chaff to fall from the combine and be windrowed. The controller also controls the swath selection door actuator to position swath selection door 104 in the closed position. When swath selection door 104 is in this closed position, the residue that is previously processed by the chopper 114 and counter knives 116 travels along path 112A, passes through spreader impellers 110, and exits the combine. Windrowing chaff may be beneficial in areas where weed prevention is desirable.

Figure 1E:
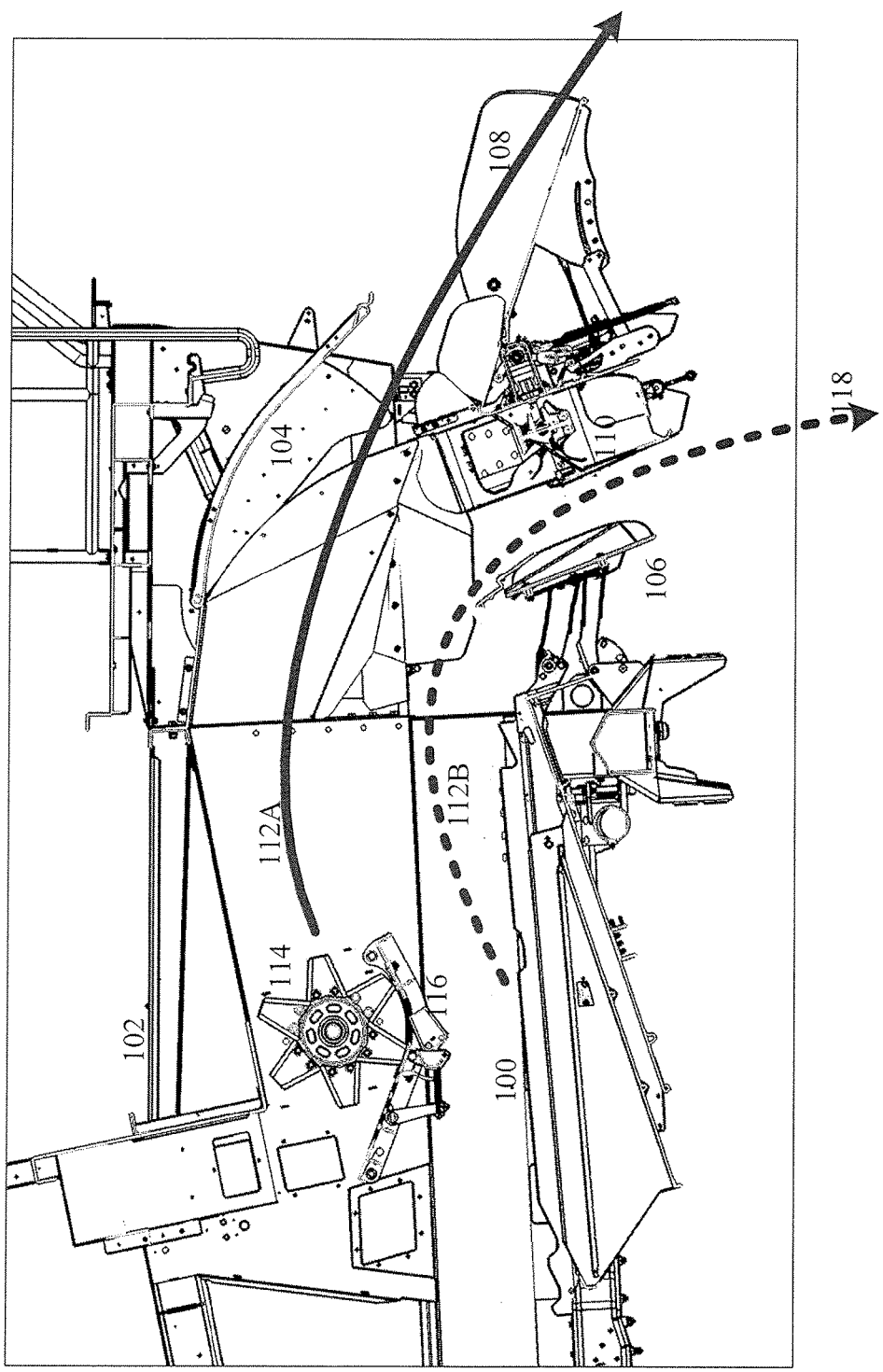
FIG. 1E is a section view of a combine residue system configured in a windrow mode, according to an embodiment of the present invention.

In a fourth mode (spread chaff and windrow straw), FIG. 1E shows the residue system operating in a combined windrow/spreading mode. In this mode, the combine controller positions spreader chute 106 such that it is tilted in a substantially vertical direction. This directs the chaff towards away from the spreader impellers allowing the chaff to fall from the combine and be windrowed. The controller also controls the swath selection door actuator to position swath selection door 104 in the open position. When swath selection door 104 is in this open position, the residue that is previously processed by the chopper 114 and counter knives 116 travels along path 112A, passes through the door, and exits the combine through windrow chute 108.

It should be noted that the straw may or may not be chopped before being thrown onto windrow chute 108. In one example (not shown) chopped straw may be windrowed by engaging counter knives 116, such that when the straw is moved passed the knives by chopper 114, the straw is cut into pieces which are then thrown along path 112A onto chute 108. In another example (shown in FIG. 1C), unchopped straw may be windrowed by disengaging the counter knives 116, such that the uncut straw is thrown by the chopper along path 112A onto chute 108.

It should be noted that the chopper and counter knives (not shown in FIG. 1B or 1C) may also be controlled differently by the controller depending on whether the combine is operating in the spreading or windrow mode. For example, in the spreading mode, the chopper may be operated at a high speed, and the counter knives may or may not be engaged. For example, increasing speed of the chopper and engaging the counter knives could produce smaller residue pieces that are better for spreading. In contrast, in the windrow mode, the chopper may be operated at a lower speed so as not to damage the straw as it is being thrown towards windrow chute 108. When the chopper is operated at this lower speed, the counter knives are disengaged. Decreasing speed of the chopper and disengaging the counter knives should produce larger residue pieces that are better for windrowing.

The modes shown in FIGS. 1B-1E are summarized in the table of FIG. 1F. In a first example, in the mode where straw and chaff are both windrowed, the chopper speed is set to low, the counter knives are disengaged, the chop/swath door is open and the chaff chute is in the substantially vertical position. In a second example, in the mode where straw and chaff are both spread, the chopper speed is set to high, the counter knives are either engaged or disengaged, the chop/swath door is closed and the chaff chute is in the substantially horizontal position. In a third example, in the mode where straw is windrowed and the chaff is spread, the chopper speed is set to low, the counter knives are disengaged, the chop/swath door is open and the chaff chute is in the substantially horizontal position. In yet a fourth example, in the mode where straw is spread and the chaff is windrowed, the chopper speed is set to high, the counter knives are either engaged or disengaged, the chop/swath door is closed and the chaff chute is in the substantially vertical position.

Figure 2:
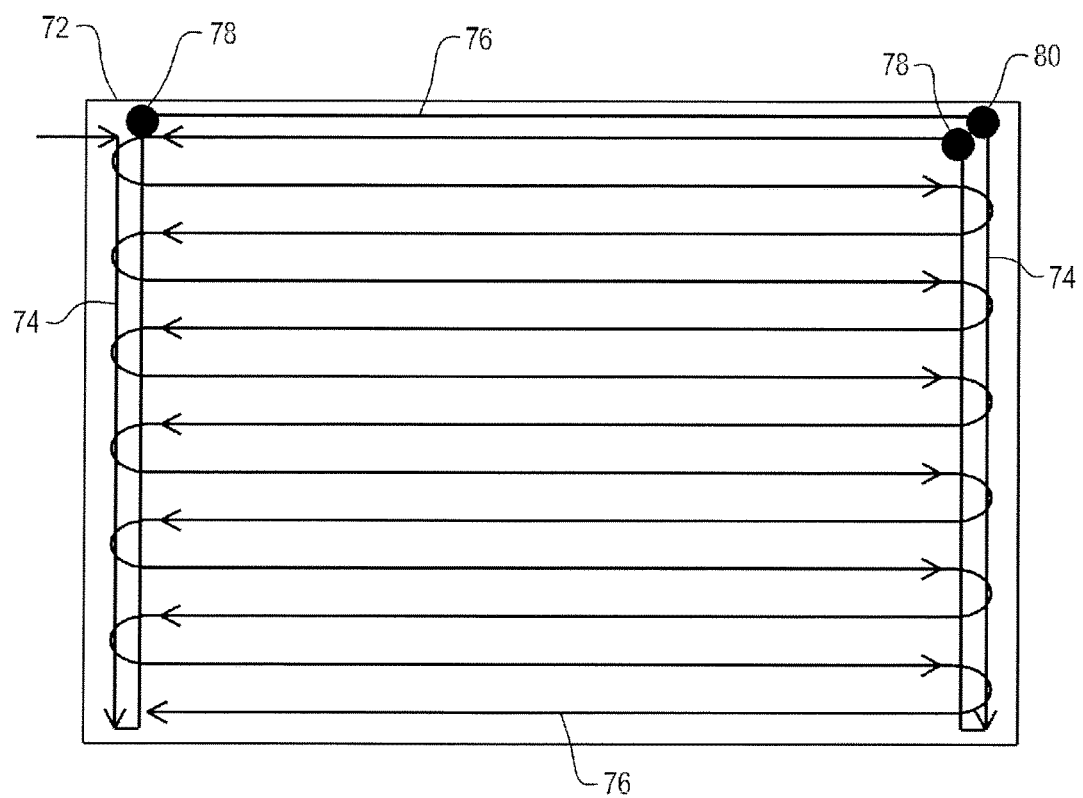
FIG. 2 is a top view of a path traversed by the combine while switching between spreading and windrow modes, according to an embodiment of the present invention.

Now that the spreading, the windrow and the combined modes have been generally described, example operations of the combine switching between these modes is described with respect to FIG. 2. In this example, combine 10 enters field 72 at the upper left and is operating in an assumed spreading mode. Combine 10 starts harvesting the crop by turning right and proceeding along a pathway in the spreading mode 74 to create a headland that is generally two header widths wide. The headland is a harvested section that permits combine 10 to turn around when harvesting the rest of the field without driving on unharvested crop. To chop and spread the crop residue in the headlands at each end of field 72 allows combine 10 to not have to cross windrows that can potentially drag beneath combine 10. The additional residue left in the headlands helps to prevent field erosion. It is also possible to have an entire border around field 72 where the crop residue is spread. At chop-to-windrow change point 78 residue handling system 70 is changed to a windrow mode and combine 10 proceeds along a pathway in a windrow mode 76 until getting to windrow-to-chop change point 80. At change point 80 residue handling system 70 is changed to a spreading mode and travels along another pathway in spreading mode 74 until reaching change point 78. At change point 78 residue handling system 70 is again changed to windrow mode 76 and the rest of field 72 is completed.

The pathways shown in FIG. 2 are fairly typical for a plot of land that is to be harvested. As described, the combine switches between the spreading and windrow modes at different locations of the field. The decision to switch may be based on various factors, including but not limited to land grade, location of water features, location of roadways, etc. The state of the art requires that the operator make these decisions on the fly while operating the combine. The present invention, however, allows the operator, or any other person (e.g. farm owner, farm manager, etc.) to set predetermined zones for performing spreading or windrowing. After zones are designated in the map, the operator no longer has to make these switching decisions. The combine automatically switches between the modes based on its current location with respect to the zones (e.g. the combine switches to spreading mode when it enters a spreading zone designated on the map).

Figure 3:
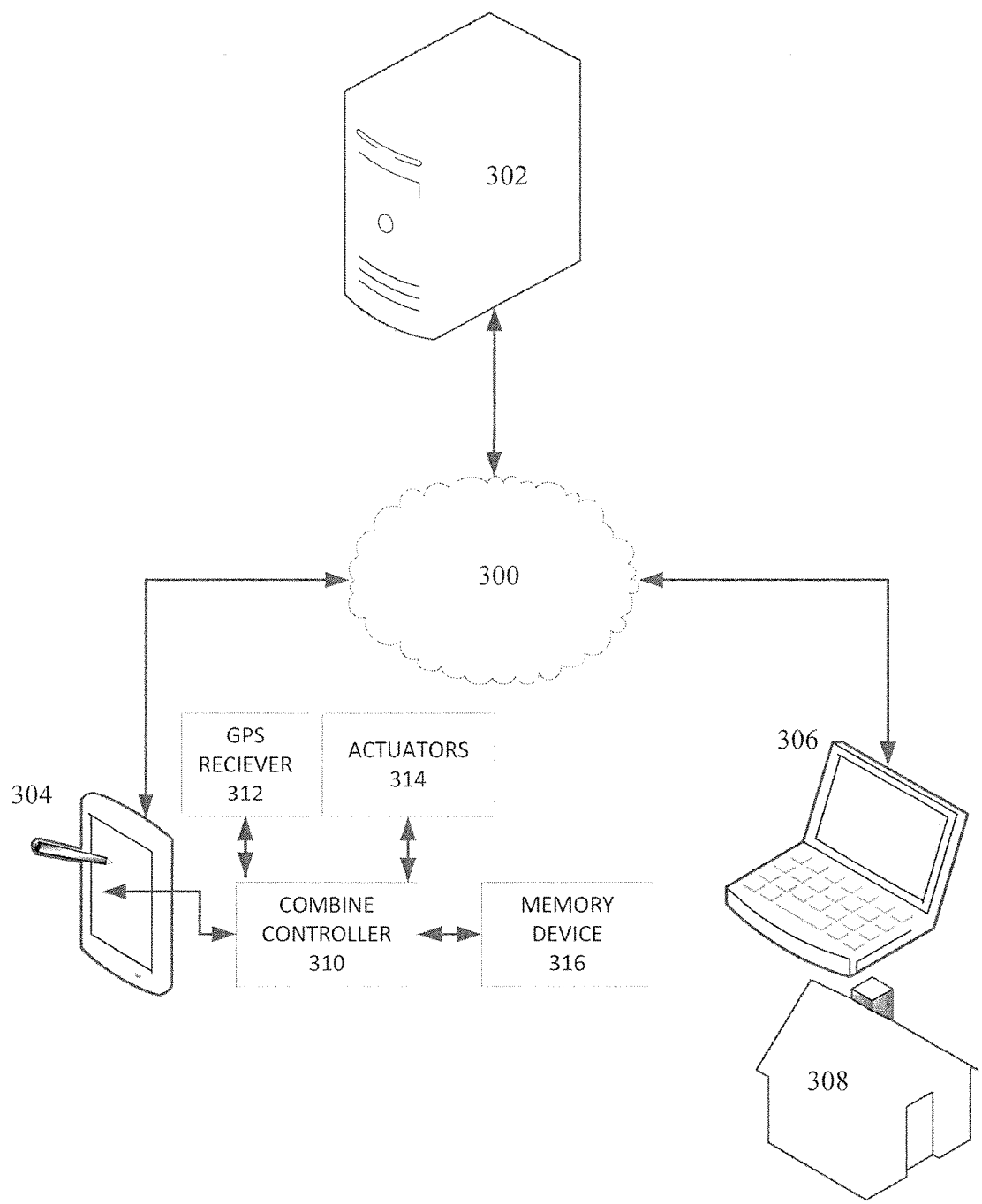
FIG. 3 is a system view of network based communication between the combine controller, a remote personal computer and a server, according to an embodiment of the present invention.

Creating the spreading and windrow zones is a process that can be performed while in the combine via a user interface, or while remote from the combine via a personal computer (PC). FIG. 3 shows an example of an interconnection between the control system (e.g. controller 310) of combine 10, a remote PC and a remote server through network 300 (e.g. Internet). It should be noted that combine 10 does not have to be connected to other devices through a network. The controller of combine 10 can be a standalone system that receives instructions for switching either locally through the user interface, or through a removable memory device (e.g. Flash Drive).

Prior to operating combine 10, an operator designates the zones for switching between the modes. In one example, the operator uses interface 304 of the combine control system or PC 306. Interface 304 and PC 306 allow the operator to view locally stored maps and download maps (e.g. new maps, updated maps, etc.) from server 302. The operator selects (via Interface 304 or PC 306) an appropriate map corresponding to the land to be harvested by the combine. Once the map is selected, the operator can determine the best areas on the map to perform spreading, and the best areas on the map to perform windrowing. This determination is based on various factors such as land grade, location of water features, location of roadways, etc. Based on these factors, the operator selects (e.g. click and drag, circle with stylus, etc.) the areas on the map for spreading and the areas on the map for windrowing. In addition, or alternatively, the controller or PC could automatically analyze the map and suggest areas for spreading and windrowing. Details of these selections are described with respect to FIGS. 5-10.

Figure 4:
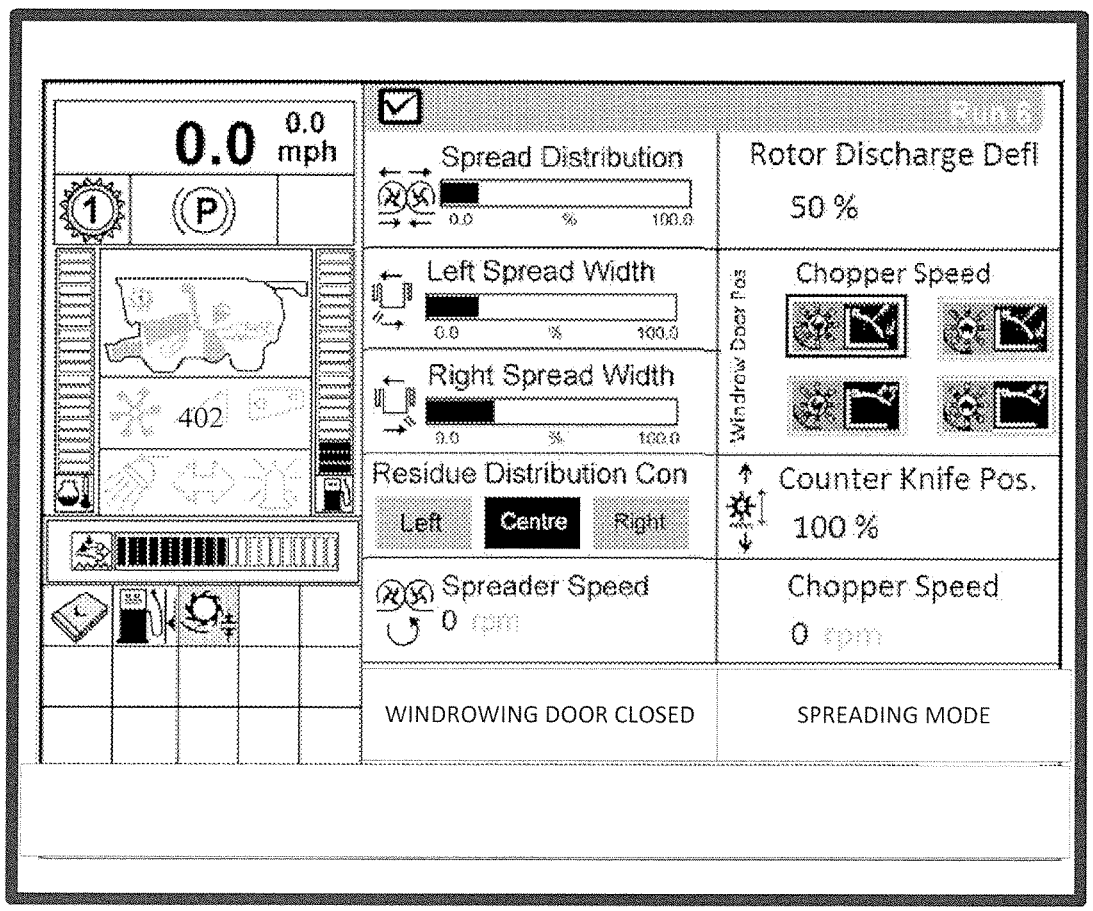
FIG. 4 is an illustration of a user interface for monitoring and controlling the combine modes, according to an embodiment of the present invention.

An example of interface 304 is shown in FIG. 4 wherein various parameters and data are displayed to the operator through a graphical user interface (GUI) 400. These may include a view of the map 402 with designated zones, land grade (not shown), current operational mode (spreading/windrow modes), and operational parameters/states for the spreader impellers (e.g. ON/OFF), chopper (e.g. rotation speed), counter knives (e.g. engage/disengage), swath selection door (e.g. open/closed), spreader chute position (e.g. horizontal/vertical), etc. These parameters may be set or changed by the operator prior to harvesting or during harvesting. For example, the operator can use a stylus or their finger on the touchscreen to select spreading/windrow zones on the map, adjust the speed of the spreader impellers, open/close the swath selection door, adjust the speed of the chopper, engage the counter knives, etc.

Figure 5:
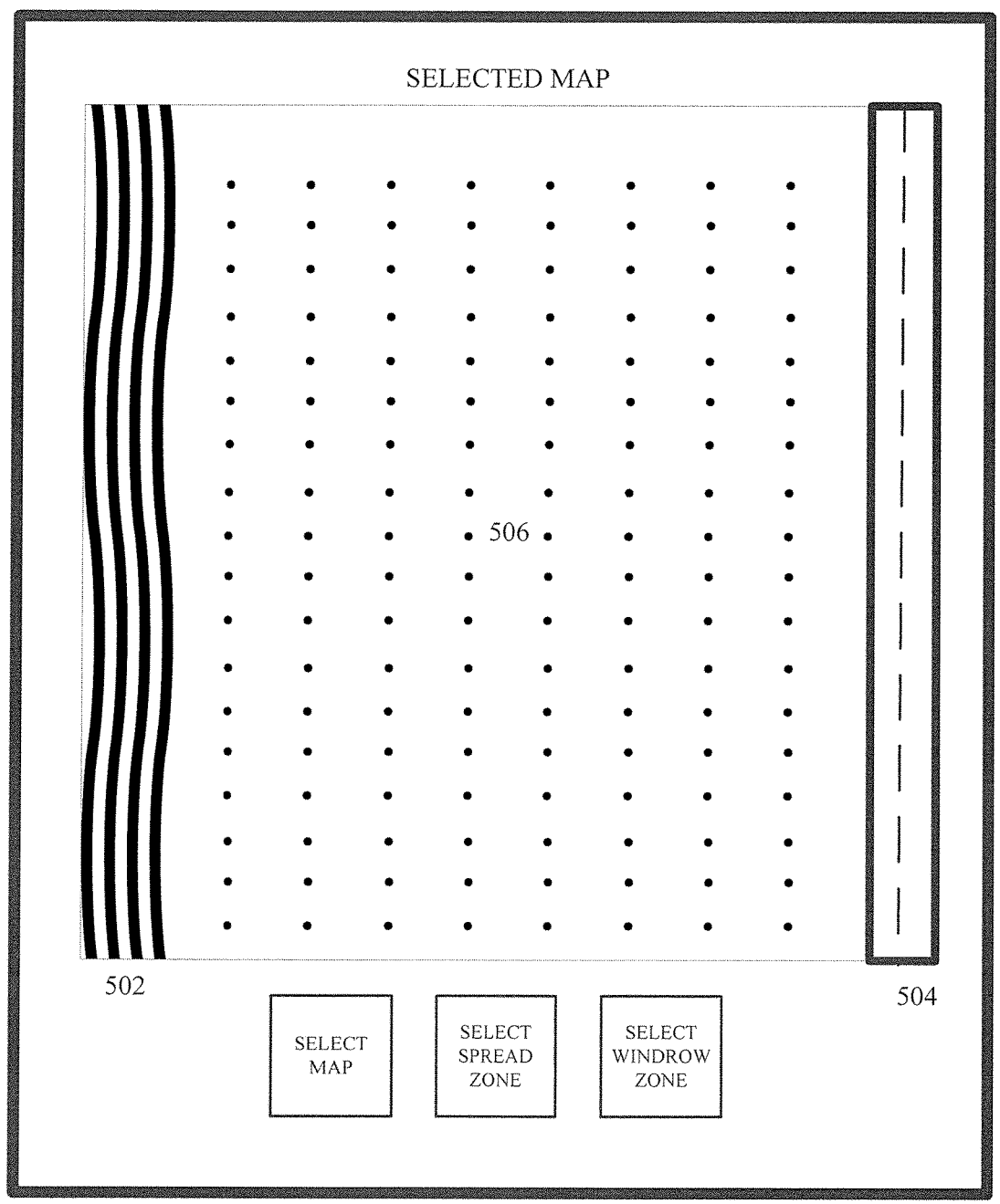
FIG. 5 is an illustration of a selected map, according to an embodiment of the present invention.
Figure 6:
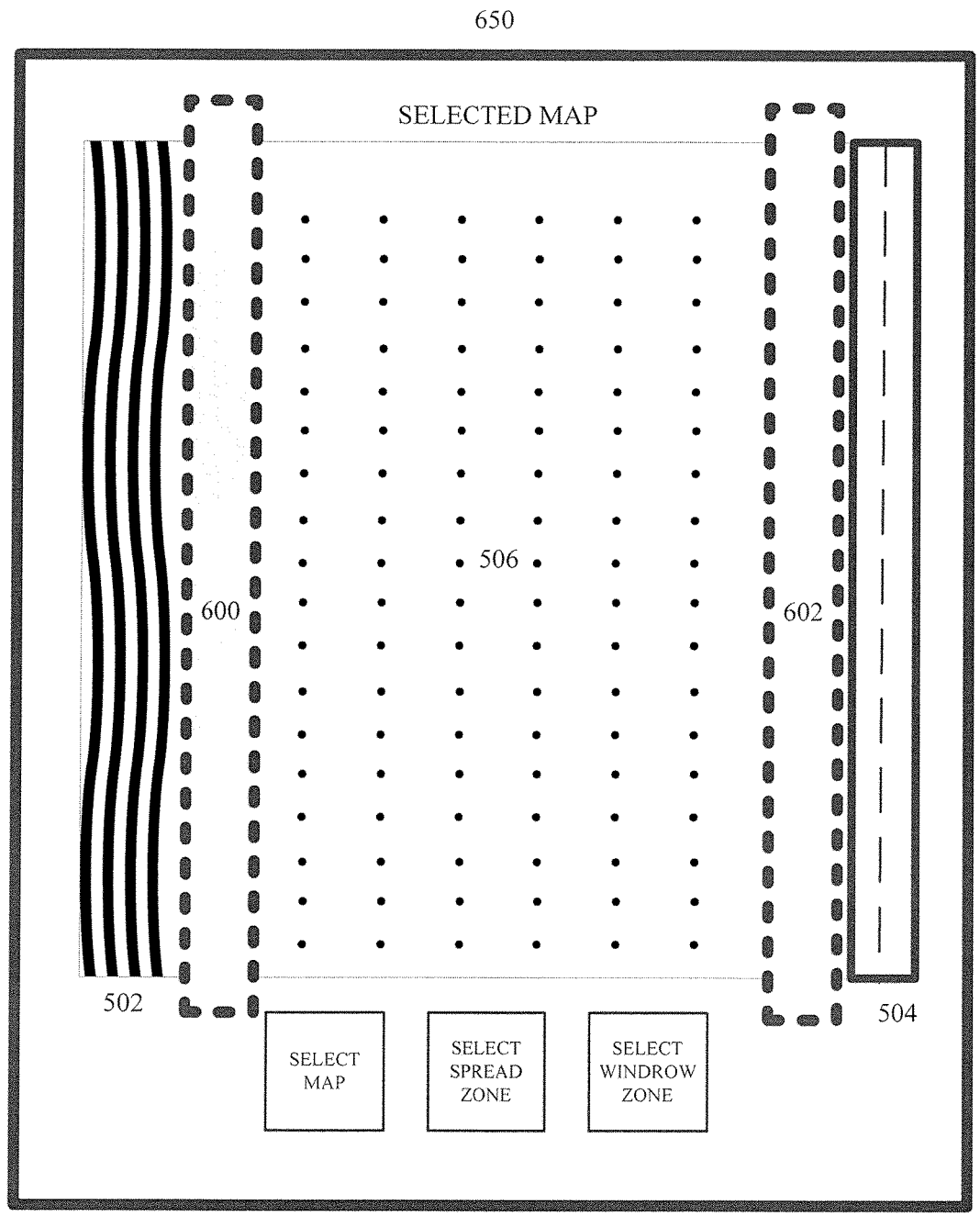
FIG. 6 is an illustration of a selected map with designated spread zones, according to an embodiment of the present invention.
Figure 7:
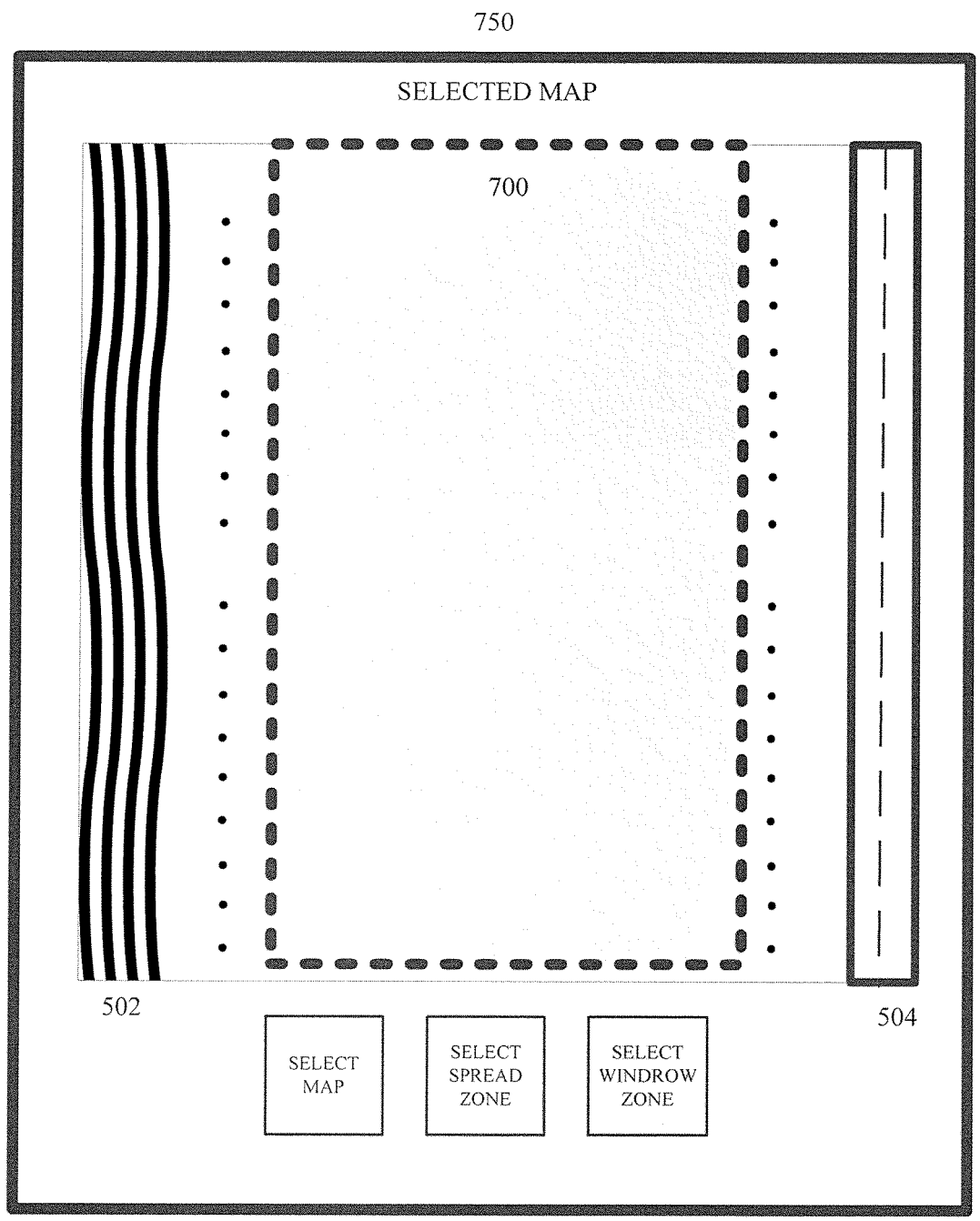
FIG. 7 is an illustration of a selected map with designated windrow zones, according to an embodiment of the present invention.

Selecting the spreading/windrow zones on the map is a process that may be performed by the operator or by any other farm employee/owner before harvesting the crop. FIGS. 5-7 show an illustration of the user interface when performing these selections on the map.

FIG. 5 shows the selection of map 500. The operator, for example, may browse through maps and select the map that corresponds to the land to be harvested (e.g. actuating the "select map" button on the touchscreen). In this example, selected map 500 is a map of a rectangular plot of land (similar to the land shown in FIG. 2) to be harvested. The map shows that this land includes a waterway 502 (e.g. river, stream, etc.), roadway 504 (e.g. dirt, paved, etc.) and crop 506 (e.g. wheat) to be harvested.

After the map is selected, the operator designates spreading and windrow zones. As shown in map 650 of FIG. 6, the operator highlights (e.g. outlines) areas 600 and 602 as spreading zones and actuates the "select spread zone" button. This decision may be based on the fact that areas 600 and 602 are bordering waterway 502 and roadway 504, respectively (e.g. windrows would be too close to the water). This decision may also be based on the grade of the land near these landmarks (e.g. steep grade is susceptible to erosion).

As shown in map 750 of FIG. 7, the operator highlights (e.g. outlines) inner area 700 as a windrow zone and actuates the "select windrow zone" button. This decision may be based on the fact that area are on a flat piece of land that is sufficiently far enough away from waterway 502 and roadway 504 respectively (e.g. windrows would be safe from disruption and could be easily collected from this area).

Figure 8:
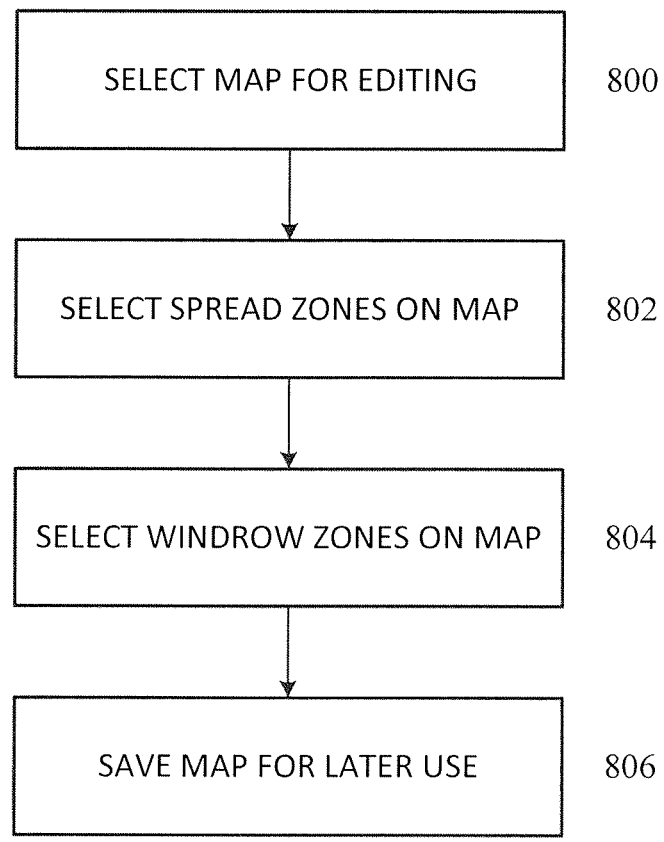
FIG. 8 is a flowchart of steps for selecting the map and zones, according to an embodiment of the present invention.

FIG. 8 shows a flowchart of the process for selecting the zones as shown in FIGS. 5-7. For example, in step 800, the operator (e.g. using interface 304) selects a map of the land to be harvested. This map may be stored in combine controller 310, downloaded from the server, or uploaded through a portable memory device, etc. In steps 802 and 804 the operator then selects spreading zones and windrow zones on the map. This selection may be as simple as the operator using his/her finger to circle areas on the map and pressing a button for confirmation. In step 806, the zoned map is saved for later use during harvesting.

Figure 9:
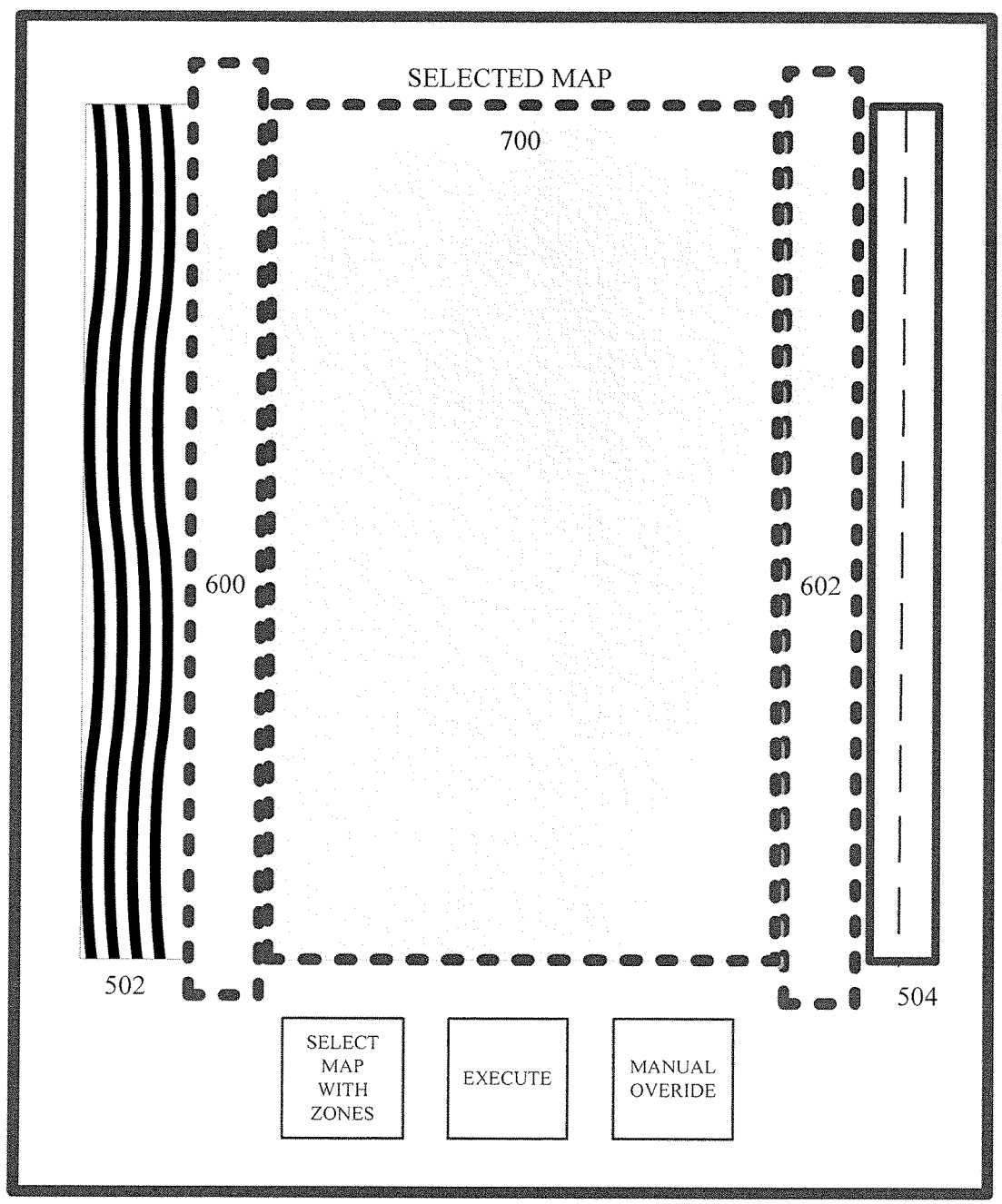
FIG. 9 is an illustration of a selected map with designated spreading zones and designated windrow zones, according to an embodiment of the present invention.

Once the zones are selected, the map is displayed via the user interface. For example, FIG. 9 shows a view of the map 950 displayed to the operator after the map has been zoned off for spreading and windrowing. As can be seen the spreading is to be performed in zones 600 and 602, while windrowing is to be performed in zone 700.

Once the zoned map is complete, the operator begins the harvesting process. For example, the operator turns on the combine and begins to drive the combine (or enters the combine into an autopilot mode) over the land. In one example, the combine follows a set pattern similar to the zig-zag pattern shown in FIG. 2 based on the spread/windrow zones displayed on the map, or based on an optimal path computed by the controller and superimposed on the map. In either scenario, during operation, the combine displays the combine's current position on interface 304 so the operator can keep track of his/her location on the map with respect to the zones. In addition, the combine could display the combine's previous position on interface 304 so the operator can keep track of his/her progress on the map.

As the combine passes over the land, the global positioning system (GPS) receiver 312 computes (e.g. periodically) the current location of the combine. This controller then compares the computed location to the zones on the map. If the controller 310 determines that the combine is located in a spreading zone, then the controller controls the appropriate actuators 314 (e.g. swath selection door actuator) to operate in the spreading mode. In contrast, if the controller determines that the combine is located in a windrow zone, then the controller controls the appropriate actuators 314 to operate in the windrow mode. Essentially, the combine controller automatically switches between the modes based on the location of the combine relative to the zones.

In this configuration, the operator does not need to perform the switching manually, although this is possible as there could be an override button on the interface allowing operator to override the automated switching process. In this automated mode, the driver can drive the combine over the land and visually confirm that the combine is operating in the correct mode set in the map. When the override button is actuated, position information associated with the override may be stored, e.g. for future use by the controller in determining when to switch between modes.

Figure 10:
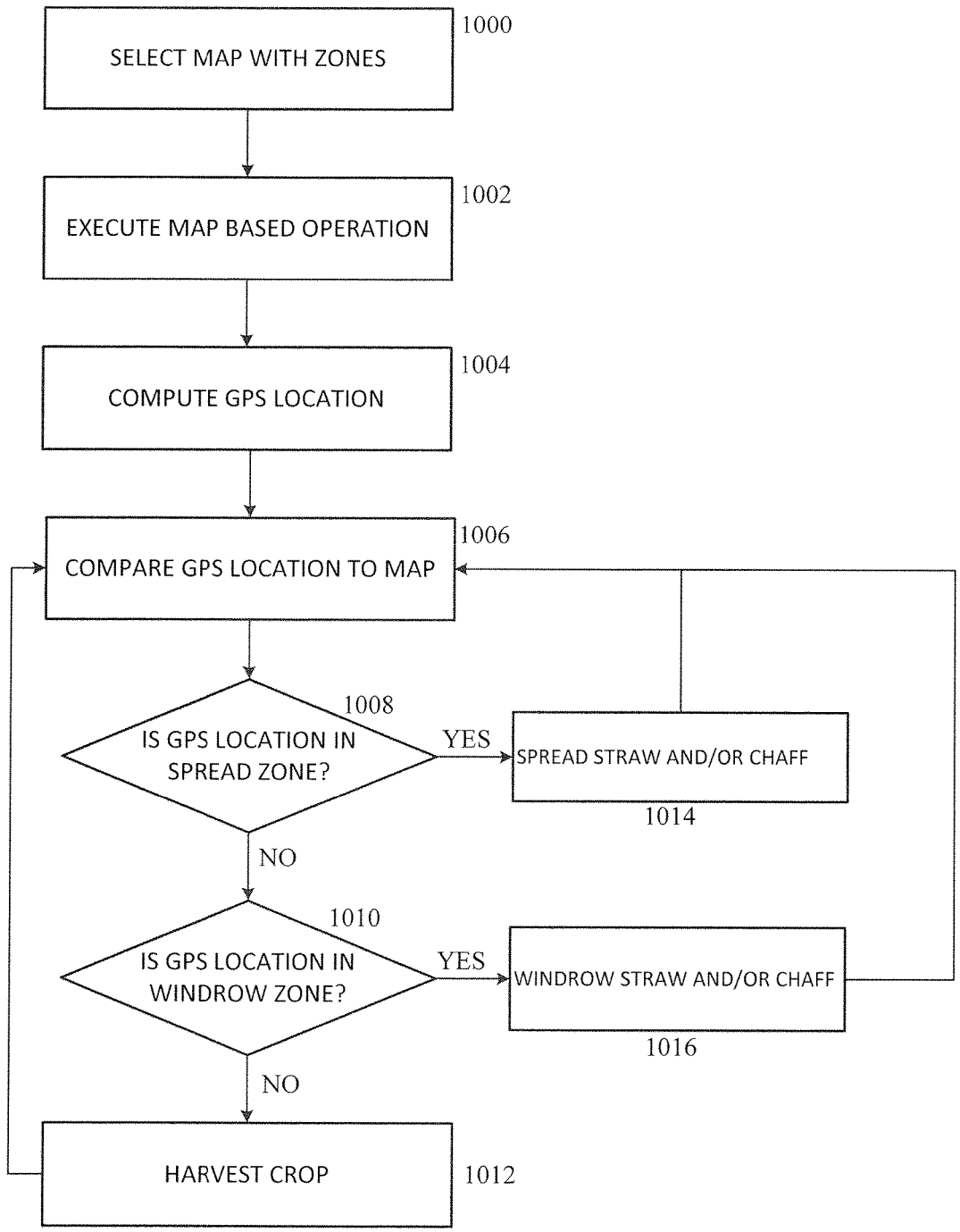
FIG. 10 is a flowchart of steps for automatically operating the combine in chopping and spreading, and windrow modes based on combine location with respect to the zones, according to an embodiment of the present invention.

FIG. 10 describes an overall process of selecting a map with designated zones, and controlling the operational mode of the combine based on the zones in the map. For example, in step 1000 the operator selects a map that corresponds to the land that is to be harvested. This map may already have designated zones previously selected by the operator or by another farm personnel (e.g. farm manager). These zones, once set, are also adjustable by the operator. For example, if the land configuration has recently changed, and the map is outdated, the operator can modify the zones. In step 1002, once the map is selected, the map is executed during the harvesting process. The operator may actuate a button to instruct the combine controller to control the actuators based on the zones designated in the selected map.

During operation of the combine, the GPS receiver receives GPS signals and computes the location of the combine. The combine location is then plotted on the map and displayed to the operator. Then, in step 1006, the controller compares the computed GPS location to the designated zones in the map. In step 1008, if the controller determines that the combine is located in a spread zone, then the controller controls the actuators to perform spreading. For example, as shown in step 1014, the controller controls the actuators in the combine to perform spreading of the straw and/or the chaff (see FIG. 1F). In contrast, in step 1010, if the controller determines that the combine is located in a windrow zone, then the controller controls the actuators to perform windrowing. For example, as shown in step 1016, the controller controls the actuators in the combine to perform windrowing of the straw and/or the chaff (see FIG. 1F).

As the combine traverses the field, the controller periodically computes the GPS location and compares it to the zones in the map. When the combine is located in a spreading zone, the combine switches to the spreading mode. When the combine is located in a windrow zone, the combine switches to the windrow mode. This process of switching between the modes is performed until the harvesting of the land is complete, or the operator suspends the harvesting process, or the operator switches to a manual override mode.

By automating the switching process between spreading and windrowing based on predefined maps/zones, the present system avoids potential human error during operation and decreases harvesting time. The operator can focus on the driving of the combine and not worry about making decision between spreading and windrowing.

It should be noted that although the combine computes its location based on GPS, that other navigation systems may be used. For example, navigation systems could include other Global Navigation Satellite Systems (GNSS), beacon based location detection (e.g. trilateration based on beacon signal strength), dead reckoning (e.g. wheel rotation speed, steering angle, etc.), or any combination thereof. In addition, features other than location may also be taken into account when determining when to switch modes. For example, combine heading and speed may be used to anticipate entering/exiting a zone, or vehicle inclination or side slope (i.e. if side slope exceeds a predetermined value, then the chopping and spreading mode is automatically selected to control erosion on the slope terrain).

It is to be understood that the steps 1000-1016 of the method of FIG. 10 are performed by the controller 310 upon loading and executing software code or instructions which are tangibly stored on a tangible computer readable medium 316, such as on a magnetic medium, e.g., a computer hard drive, an optical medium, e.g., an optical disc, solid-state memory, e.g., flash memory, or other storage media known in the art. Thus, any of the functionality performed by the controller 310 described herein, such as the steps 1000-1016 of the method of FIG. 10, is implemented in software code or instructions which are tangibly stored on a tangible computer readable medium. Upon loading and executing such software code or instructions by the controller 310, the controller 310 may perform any of the functionality of the controller 310 described herein, including the steps 1000-1016 of the method of FIG. 10 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Although the invention is illustrated and described herein with reference to specific embodiments, the invention is not intended to be limited to the details shown. Rather various modifications may be made in the details within the scope and range of equivalence of the claims and without departing from the invention.

The invention claimed is:

1. A combine comprising:
   a chassis;
   a crop residue handling system including a residue chopper, residue spreader, a spreader chute and a swath selection door;
   a receiver configured to determine a location of the combine; and
   a controller that controls the residue handling system, the controller configured to:
   determine the location of the combine on a map,
   execute a crop residue spreading mode by closing said swath selection door to spread the crop residue or by positioning the spreader chute to spread the crop residue, in response to the controller determining that the location of the combine is located in a designated crop residue spreading zone indicated on the map, and
   execute a crop residue windrow mode opening said swath selection door to pile the crop residue in windrows or by positioning the spreader chute to pile the crop residue in windrows, in response to the controller determining that the location of the combine is located in a designated crop residue windrow zone indicated on the map
wherein the crop residue spreading zone and the crop residue windrow zone are designated either automatically by the controller or by an operator based on at least one of land grade, water features, or roadways on the map.

2. The combine of claim 1, further comprising:
counter blades configured to cut the crop,
wherein the controller is further configured to:
increase a speed of the chopper and engage the counter blades to cut the crop when executing the crop residue spreading mode, and
decrease the speed of the chopper and disengage the counter blades when executing the crop residue windrow mode.

3. The combine of claim 1, further comprising:
wherein the controller is further configured to:
rotate the chopper at a first speed when executing the crop residue spreading mode, and
rotate the chopper at a second speed when executing the crop residue windrow mode, the second speed being less than the first speed.

4. The combine of claim 1, further comprising:
at least one of hydraulic or electric actuators for controlling each of the residue spreader and swath selection door,
wherein the controller is further configured to control the at least one of hydraulic or electric actuators to control rotation of the residue spreader and the opening and closing of the swath selection door.

5. The combine of claim 1, further comprising:
an operator interface,
wherein the controller is further configured to provide an override indication on the operator interface that allows the operator to manually override at least one of the residue spreading mode or the residue windrow mode.

6. The combine of claim 1, further comprising:
a touch screen display,
wherein the controller is further configured to display an indicator on the touch screen display that indicates if the residue spreading mode or the residue windrow mode is active, and indicates when a switching between the modes will occur.

7. The combine of claim 1, further comprising:
a touch screen display,
wherein the controller is further configured to display the map on the touch screen display and enable the operator to add, delete or modify the residue spreading zones and the residue windrow zones.

8. The combine of claim 1, further comprising:
an interface for uploading the map to the controller,
wherein the interface enables the operator to add, delete or modify the residue spreading zones and the residue windrow zones in the map on a remote computer, and then upload the map to the controller.

9. A combine comprising:
a chassis;
a crop residue handling system including a residue chopper, residue spreader, a spreader chute and a swath selection door;
a receiver configured to determine a location of the combine; and
a controller that controls the residue handling system, the controller configured to:
determine the location of the combine on a map,
execute a crop residue spreading mode by closing said swath selection door to spread the crop residue or by positioning the spreader chute to spread the crop residue, in response to the controller determining that the location is in a designated crop residue spreading zone indicated on the map,
execute a crop residue windrow mode opening said swath selection door to pile the crop residue in windrows or by positioning the spreader chute to pile the crop residue in windrows, in response to the controller determining that the location is in a designated crop residue windrow zone indicated on the map, and
display suggested areas on the map for setting as the residue spreading zone or the residue windrow zone, the suggestions based on at least one of land grade, water features, or roadways on the map.

10. A method for controlling a combine including a chassis, a crop residue handling system including a residue spreader, a spreader chute, and a swath selection door, a receiver configured to determine a location of the combine, and a controller configured to control the residue handling system, the method comprising:
determining, by the controller, the location of the combine on a map;
executing, by the controller, a crop residue spreading mode by closing said swath selection door to spread the crop residue or by positioning the spreader chute to spread the crop reside, in response to the controller determining that the location of the combine is located in a designated crop residue spreading zone indicated on the map;
executing, by the controller, a crop residue windrow mode by opening said swath selection door to pile the crop residue in windrows or by positioning the spreader chute to pile the crop residue in windrows, in response to the controller determining that the location of the combine is located in a designated crop residue windrow zone indicated on the map; and
designating, by the controller, the crop residue spreading zone and the crop residue windrow zone either automatically or by allowing an operator to designate the zones based on at least one of land grade, water features, or roadways on the map.

11. The method of claim 10, further comprising:
engaging, by the controller, counter blades configured to cut the crop when the combine is executing the crop residue spreading mode; and
disengaging, by the controller, the counter blades when the combine is executing the crop residue windrow mode.

12. The method of claim 10, further comprising:
rotating, by the controller, a chopper configured to chop the crop at a first speed when the combine is executing the crop residue spreading mode; and
rotating, by the controller, the chopper at a second speed when the combine is executing the crop residue windrow mode, the second speed being less than the first speed.

13. The method of claim 10, further comprising:
controlling, by the controller, at least one of hydraulic or electric actuators to control rotation of the residue spreader and the opening and closing of the swath selection door.

14. The method of claim 10, further comprising:
displaying, by the controller, an override button on a touch screen display that allows the operator to manually override at least one of the residue spreading mode or the residue windrow mode.

15. The method of claim 10, further comprising:
displaying, by the controller, an indicator on a touch screen display that indicates whether the combine is in the residue spreading mode or the residue windrow mode, and indicates when a switching between the modes will occur.

16. The method of claim 10, further comprising:
displaying, by the controller, the map on the touch screen display which enables the operator to add, delete or modify the residue spreading zones and the residue windrow zones.

17. The method of claim 10, further comprising:
enabling, by the controller, the operator to add, delete or modify the residue spreading zones and the residue windrow zones in the map on a remote computer, and then upload the map to the controller through an interface.

18. A method for controlling a combine including a chassis, a crop residue handling system including a residue spreader, a spreader chute, and a swath selection door, a receiver configured to determine a location of the combine, and a controller configured to control the residue handling system, the method comprising:
    determining, by the controller, the location of the combine on a map;
    executing, by the controller, a crop residue spreading mode by closing said swath selection door to spread the crop residue or by positioning the spreader chute to spread the crop reside in response to the controller determining that the location of the combine is located in a designated crop residue spreading zone indicated on the map;
    executing, by the controller, a crop residue windrow mode by opening said swath selection door to pile the crop residue in windrows or by positioning the spreader chute to pile the crop residue in windrows, in response to the controller determining that the location of the combine is located in a designated crop residue windrow zone indicated on the map; and
    displaying, by the controller, suggested areas on the map for setting as the residue spreading zone or the residue windrow zone, the suggestions based on at least one of land grade, water features, or roadways on the map.

* * * * *